United States Patent [19]

Lam et al.

[11] Patent Number: 4,942,383
[45] Date of Patent: Jul. 17, 1990

[54] LOW COST WET-TO-WET PRESSURE SENSOR PACKAGE

[75] Inventors: Man K. Lam; Milton W. Mathias, both of Colorado Springs, Colo.

[73] Assignee: Honeywell Inc., Minneapolis, Minn.

[21] Appl. No.: 320,170

[22] Filed: Mar. 6, 1989

[51] Int. Cl.[5] .............................................. H01L 10/10
[52] U.S. Cl. ............................................ 338/42; 338/4; 338/36; 73/719; 73/720
[58] Field of Search .................. 338/2, 3, 4, 5, 36, 338/42; 73/721, 719, 720

[56] References Cited

U.S. PATENT DOCUMENTS

| | | | |
|---|---|---|---|
| 4,373,397 | 2/1983 | Keller | 73/721 |
| 4,655,088 | 4/1987 | Adams | 73/756 |
| 4,656,454 | 4/1987 | Rosenberger | 338/2 |
| 4,658,651 | 4/1987 | Le | 73/708 |
| 4,665,754 | 5/1987 | Glenn | 73/727 |

*Primary Examiner*—Bruce A. Reynolds
*Assistant Examiner*—Marvin M. Lateef
*Attorney, Agent, or Firm*—W. T. Udseth

[57] ABSTRACT

A wet-to-wet pressure sensor package (10) having a housing (12) with a pressure sensitive semiconductor die (34) supported within a resilient mounting (44) including continuous beads (46, 48) of elastomeric adhesive on the same portion of the housing to provide a protective seal with less stress so that improved sensitivity and repeatability of the wet-to-wet pressure sensor is achieved.

15 Claims, 1 Drawing Sheet

U.S. Patent  Jul. 17, 1990  4,942,383
FIG. 1
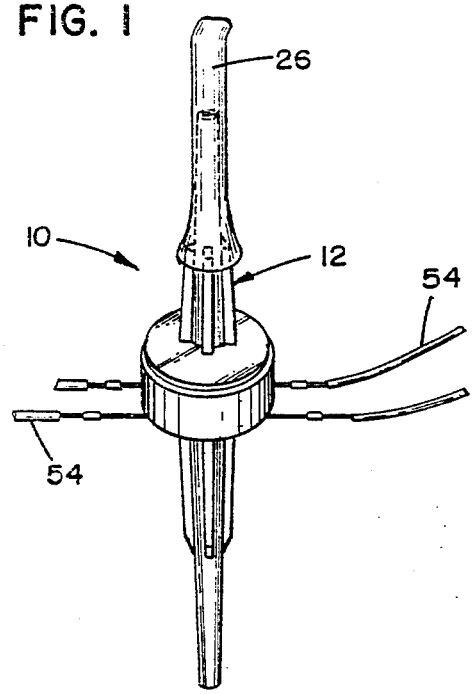
FIG. 2
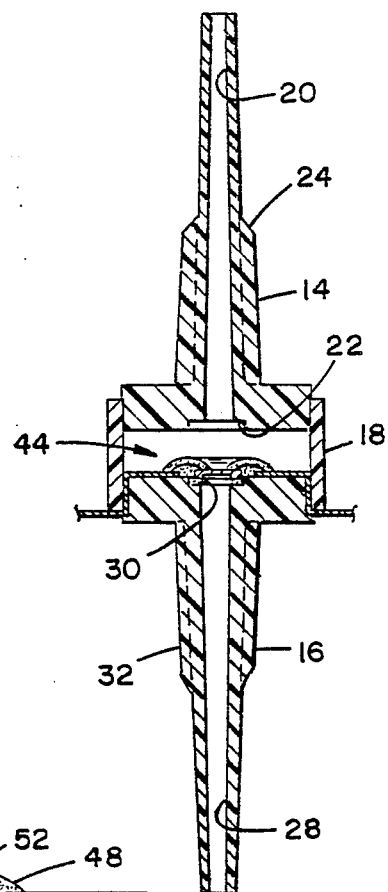
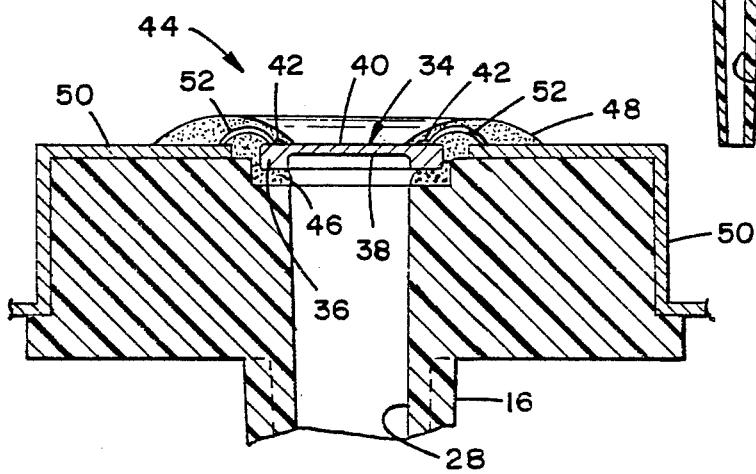
FIG. 3

LOW COST WET-TO-WET PRESSURE SENSOR PACKAGE

TECHNICAL FIELD

The present invention relates generally to pressure sensing devices incorporating stress sensitive semiconductors. More particularly, this invention concerns an improved wet-to-wet pressure sensor package wherein the semiconductor die is mounted between continuous peripheral beads of elastomeric adhesive in order to achieve better performance at lower cost.

BACKGROUND ART

A variety of pressure transducers have been developed heretofore for various applications. Many such transducers incorporate a pressure sensitive silicon die having piezoresistive elements on one side thereof which generate corresponding electrical signals upon flexure of the die in response to pressure. Proper mounting of the pressure sensitive silicon die is crucial to performance of the transducer.

One such type of transducer is the so-called "wet-to-wet" pressure transducer wherein the die serves as a diaphragm between two fluid pressure media in direct contact therewith. Such transducers are used in various medical and automotive applications, vending machines, etc. In pressure transducers of this type, the die must be mounted in a way which not only provides the necessary mechanical support, but which also provides a fluid-tight seal in accordance with the particular application. Since the die is in direct contact with the fluid media, a protective coating is often provided which can affect sensitivity and repeatability. Consequently, for best performance it is especially desirable to mount the die in a manner which minimizes extraneous stresses thereon while satisfying the necessary mechanical supporting and fluid-sealing requirements.

Pressure transducers with elastomeric mounts have also been available heretofore. For example, U.S. Pat. No. 4,656,454 to Rosenberger, which is assigned to Honeywell Inc., the assignee hereof, shows a wet-to-wet pressure sensor wherein the die is clamped between premolded elastomeric ring seals seated in opposing portions of a housing. Although this pressure transducer performs quite well, there are some drawbacks to the particular type of mounting utilized therein. The silicon die is under continuous stress which interferes with sensitivity. Small manufacturing variations in the premolded elastomeric seals and/or variations in assembly of the package can induce additional stresses which can affect proper fluid sealing and further interfere with sensitivity. Also, the configuration of the mounting virtually requires the use of a protective coating on the exposed circuitry elements of die which in turn increases hysteresis effects, reducing repeatability and performance. U.S. Pat. Nos. 4,665,754 to Glenn, 4,658,651 to Le, and 4,373,397 to Keller are also representative of the prior art in this regard.

A need has thus arisen for an improved wet-to-wet pressure sensor having a better elastomeric mounting which satisfies the necessary fluid-sealing requirements while at the same time avoiding unnecessary stresses on the die and protecting exposed circuit elements from corrosion by the contacting fluid media in order to achieve better sensitivity and performance.

SUMMARY OF INVENTION

The present invention comprises a pressure sensor package which overcomes the foregoing and other difficulties associated with the prior art. In accordance with the invention, there is provided an improved wet-to-wet pressure sensor package comprising a pressure sensitive silicon chip or die supported by an elastomeric mounting within a housing. The elastomeric mounting isolates the die from extraneous stress, provides the necessary fluid sealing, and provides protection for exposed circuit elements, for better sensitivity, repeatability and overall performance. The die is mounted between two continuous peripheral beads of elastomeric adhesive on the same portion of the housing without overlap or direct contact with any other portion of the housing.

BRIEF DESCRIPTION OF DRAWINGS

A better understanding of the invention can be had by reference to the following Detailed Description in conjunction with the accompanying Drawing, wherein:

FIG. 1 is a perspective view of the wet-to-wet pressure sensor package of the invention;

FIG. 2 is an enlarged vertical cross-sectional view of the wet-to-wet pressure sensor package herein; and FIG. 3 is an enlarged cross-sectional illustration of the elastomeric mounting for the pressure sensitive die herein.

DETAILED DESCRIPTION

Referring now to the Drawing, wherein like reference numerals designate like or corresponding elements throughout the views, there is shown the improved wet-to-wet pressure sensor package 10 of the invention. As will be explained more fully hereinbelow, the sensor package 10 includes a, pressure sensitive element mounted between peripheral beads of elastomeric adhesive in order to isolate stress, provide fluid sealing, and protect the exposed circuit elements thereof.

The pressure sensor package 10 comprises a housing 12 which, in the form illustrated, includes opposite covers 14 and 16 interconnected in spaced-apart relationship by a surrounding side wall 18. The housing 12 defines a small chamber therein. The top cover 14 includes an axial port or bore 20 extending therethrough from the outer end to a recess 22 in the inner end. A plurality of longitudinal ribs 24 are provided about the outside surface of the top cover 14 for receiving and securing one end of a length of tubing 26 extending to the source of fluid whose pressure is to be monitored. In the preferred embodiment as illustrated, the bottom cover 16 is of identical construction including an axial port or bore 28, recess 30, and external longitudinal ribs 32. Another length of tubing (not shown) from another fluid source, is connected to the bottom cover 16.

In the preferred embodiment, covers 14 and 16 of housing 12 are identical. Each cover 14 and 16 includes tapered outer end and an enlarged inner end, the outside surface of which is notched to define a shoulder for receiving the side wall 18. The covers 14 and 16 and side wall 18 are preferably molded from suitable thermoplastic and secured together by ultrasonic welding adhesive or any other suitable technique.

Referring particularly to FIGS. 2 and 3, a stress sensitive chip or die 34 is supported entirely on the inside of the lower cover 16. In particular, the die 34 comprises a generally rectangular or square chip of semiconductor material, such as silicon, having a peripheral edge 36 and a circular central area of reduced thickness forming a diaphragm 38. The upper surface 40 of the die 34 is doped to provide an arrangement of piezoresistors and other conductive regions therein. Contact pads 42 and other exposed circuit elements are located about the top surface of the peripheral edge 36.

The die 34 is supported within an elastomeric mounting 44 comprising two continuous beads 46 and 48 of elastomeric adhesive. In particular, the lower bead of elastomeric adhesive 46 extends about the lower peripheral edge 36 of the die 34 and recess 30 in the lower cover 16, which recess it will be noted is relatively larger than the die 34 to avoid any contact or binding therebetween. The top bead 48 of elastomeric adhesive extends about the upper peripheral edge 36 of the die 34, the internal end portions of a metal lead frame 50, and intermediate portions of the lower cover 16. It will be noted that the upper bead 48 also covers and thus protects the contact pads 42 and other exposed circuit elements, as well as wire bonds 52 interconnecting the contact pads on the die 34 with the lead frame 50, which is molded into the inside end of lower cover 16, in order to protect the exposed circuit elements from corrosion. The internal end portions of the lead frame 50 are secured to cover 16, but the external end portions of the lead frame extend outside housing 12 for connection to wires 54 of the control circuitry (not shown).

In the preferred embodiment, the elastomeric beads 46 and 48 are comprised of soft elastomeric adhesive, such as GE room temperature vulcanizing (RTV) silicone rubber no. 162. If the fluid environment is hostile or corrosive, GE Fluorosilicone can be used.

As illustrated, the pressure sensor package 10 is adapted for sensing the relative pressure differential between two fluids connected to ports 20 and 28 of housing 12. However, if desired, the sensor 10 can be modified to sense absolute or gauge pressure of a fluid connected to port 20 by sealing off port 28 and evacuating the space therein so as to provide a vacuum reference.

Experimental test results from eighteen (18) sample units have confirmed the improved performance of this sensor package 10. Direct comparison tests were conducted at 1 and 17 psi between the sensor package herein and the Model 16PC shown in U.S. Pat. No. 4,656,454. The emphasis was on hysteresis and the test results were as follows:

| Parameter | 16PC | Experimental Sensor Package |
| --- | --- | --- |
| Null Shift (0/50° C.) | ±4.0 mv. | 0–1.86 mv. |
| Span Shift (0/50° C.) | ±3.0% F.S.O. | 1.9–3.69% F.S.O. (2 units failed at 3.0) |
| Hysteresis (forward/reverse, 0/50° C.) | ±0.25% F.S.O. | 0.019% F.S.O. avg. (0.16% F.S.O. worst unit.) |
| Linarity | ±0.50% F.S.O. | 0.20% F.S.O. worst units |
| where F.S.O. = full scale output | | |

From the foregoing, it will thus be apparent that the present invention comprises an improved wet-to-wet pressure sensor package having several advantages over the prior art. One significant advantage is that the die is suspended within an elastomeric mounting that is secured to and supported on the same portion of the housing in order to isolate the die from stress for more sensitivity and accuracy. The upper bead also serves to protect wire bonds and other exposed circuit elements about the periphery of the die, from corrosion without overlaying the central diaphragm area. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A pressure sensor package, which comprises:
   a housing defining a chamber bounded in part by opposing spaced-apart top and bottom end walls;
   a pressure-sensitive die disposed in a recess in the bottom end wall of said housing;
   said die including a peripheral edge, a reduced central portion, a top surface with a piezoresistive circuit in the central portion connected to a plurality of exposed circuit elements including contact pads on the peripheral edge, and a bottom surface;
   a lead frame secured to the bottom end wall of said housing in spaced relationship with said die, said lead frame including a plurality of internal and external end portions;
   a plurality of wire bonds interconnecting the contact pads of said die and the internal end portions of said lead frame; and
   bead means for suspending said die between the recess in the bottom end wall of said housing, the internal end portions of said lead frame, and intermediate portions of the bottom end wall of said housing and for protectively covering the exposed circuit elements and contact pads on said die and said wire bonds therein, without overlapping the reduced central portion of said die.

2. The pressure sensor package of claim 1, wherein said housing comprises:
   a top cover including outer end and an enlarged inner end terminating in the top end wall;
   a bottom cover including outer end and an enlarged inner end terminating in the bottom end wall; and
   a surrounding side wall interconnecting the inner ends of said top and bottom covers in relative spaced-apart relationship.

3. The pressure sensor package according to claim 2, wherein said top and bottom covers and said side wall are formed from thermoplastic.

4. The pressure sensor package according to claim 2, further including:
   longitudinal ribs on the outer ends of said top and bottom covers adjacent their respective end walls for securing tubing thereon.

5. The pressure sensor package of claim 1, wherein said bead means comprises:
   elastomeric adhesive extending between the peripheral edge on the bottom surface of said die and the recess in the bottom end wall of said housing; and elastomeric adhesive extending between the peripheral edge on the top surface of said die, the internal end portions of said lead frame, and intermediate portions of the bottom end wall of said housing.

6. The pressure sensor package according to claim 5, wherein said elastomeric adhesive comprises room temperature vulcanizing silicone rubber.

7. The pressure sensor package according to claim 5, wherein said elastomeric adhesive comprises Flourosilicone rubber.

8. The pressure sensor package of claim 1, further including:
means defining a fluid port opening onto the recess in the bottom end wall of said housing.

9. A pressure sensor package, which comprises:
a housing defining a chamber bounded in part by opposing spaced apart top and bottom end walls;
a pressure-sensitive die loosely disposed in a recess in the bottom end wall of said housing;
said die including a peripheral edge, a central diaphragm portion, a top surface with a piezoresistive circuit in the diaphragm portion connected to a plurality of exposed circuit elements including contact pads on the peripheral edge, and a bottom surface;
a lead frame secured to the bottom end wall of said housing in space relationship with said die, said lead frame including a plurality of internal and external end portions;
a plurality of wire bonds interconnecting the contact pads of said die and the internal end portions of said lead frame;
a continuous lower bead of elastomeric adhesive extending between the peripheral edge on the bottom surface of said die and the recess in the bottom end wall of said housing;
a continuous upper bead of elastomeric adhesive extending between the peripheral edge on the top surface of said die, the internal end portions of said lead frame, and intermediate portions of the bottom end wall of said housing;
said upper bead protectively covering the exposed circuit elements and contact pads on said die and said wire bonds therein, without overlapping the diaphragm portion of said die;
means defining a fluid port in the top end wall of said housing; and
means defining a fluid port opening onto the recess in the bottom end wall of said housing.

10. The pressure sensor package of claim 9, wherein said housing comprises:
a top cover including an outer end and an enlarged inner end terminating in the top end wall;
a bottom cover including an outer end and a enlarged inner end terminating in the bottom end wall; and
a surrounding side wall interconnecting the inner ends of said top and bottom covers in relative spaced-apart relationship.

11. The pressure sensor package according to claim 10, wherein said top and bottom covers and said side wall are formed from thermoplastic.

12. The pressure sensor package according to claim 10, further including:
longitudinal ribs on the outer ends of said top and bottom covers adjacent their respective end walls for securing tubing thereon.

13. The pressure sensor package of claim 9, wherein said upper and lower beads of elastomeric adhesive comprise room temperature vulcanizing silicone rubber.

14. The pressure sensor package of claim 9, wherein said upper and lower beads of elastomeric adhesive comprise Fluorosilicone rubber.

15. The pressure sensor package of claim 1, further including:
means defining a fluid port in the top end wall of said housing.

* * * * *